Samuel Thaler,
INVENTOR.
BY.
AGENT.

United States Patent Office 3,441,934
Patented Apr. 29, 1969

3,441,934
DOPPLER SHIFT CORRECTION
ANALOG COMPUTER
Samuel Thaler, Encino, Calif., assignor to Hughes Aircraft Company, Culver City, Calif., a corporation of Delaware
Filed July 12, 1967, Ser. No. 652,797
Int. Cl. G01s 9/46
U.S. Cl. 343—8    8 Claims

ABSTRACT OF THE DISCLOSURE

An analog motion compensation loop provides a Doppler shift computed by a clutter tracking loop. The motion compensation loop attempts to predict the instantaneous measured Doppler shift of a received radar Doppler signal and to control a controlled oscillator to remove clutter signals. The Doppler error is measured by a discriminator which has an output voltage proportional to the Doppler error. A detector and threshold circuit sense the amplitude of the clutter signal and control a gate which forces the discriminator output to a minimum when the clutter power falls below a predetermined reference value. The feedback control loop continues to function in the desired manner as long as the clutter is present over part of the selected azimuth and elevation search pattern.

Background of the invention

This invention relates to analog computers and more particularly to an improved analog computer useful in computing Doppler shift velocities or the like.

Prior art devices have been developed to perform the function of removing the Doppler shift of echoes from radar receiving signals and to facilitate the separation of targets which move relative to the ground from the ground echo. Such prior art devices fall within several categories, first of which is a class of specialized devices which has the sole purpose of electronically measuring the aircraft ground velocity and thereafter separating the ground velocity from the target velocity. These, of course, require specialized separate devices, which are quite complex and expensive when compared to the present invention. A second system attempts to track the Doppler shift of the clutter as the antenna of a search radar scans without taking into account the available knowledge of antenna beam direction. Since the Doppler shift changes rapidly as the antenna scans, such device must have rather wide tracking bandwiths so that they have the disadvantage of having an output which is quite noisy. Another method for performing these functions provides a system which computes the average Doppler error between that measured and that expected for several sectors of the antenna scan, and then computes the error in velocity which would have given rise to the computed average sector errors and correct the velocity accordingly. This method has the disadvantage of being a sampled data device which has a response time limited by the sampling period. Also, it may provide erroneous corrections when clutter return is present over only parts of the sectors used. In a search radar, it is desirable that the device which tracks the ground velocity not require a special scan pattern or a special distribution of scatters on the ground.

Summary of the invention

Briefly described, the present invention provides an analog computer system capable of distinguishing ground clutter Doppler returns which includes a motion compensation means for introducing computed Doppler shift correction signals into the radar system. The tracking of the ground velocity is performed in a coordinate system in which the velocity components change very slowly. This permits the use of the largest smoothing time consistent with the ability to follow aircraft motion. The resulting ground velocity and the computed Doppler shifts have a smoothness or freedom from noise important to some radar data processor systems.

It therefore becomes one object of this invention to provide a novel and improved analog computer useful in ground velocity tracking radar, which allows a radar to search in its normal pattern in elevation and azimuth and still be capable of tracking ground clutter and ground velocity as long as clutter return is received over any part of the scanning pattern.

Another object of this invention is to provide a novel and improved analog computer useful in ground tracking velocity radar systems which requires no special scan pattern or clutter environment.

Another object of this invention is to provide an analog computer capable of computing Doppler shift correction signals from real time inputs for use in a radar system.

Another object of this invention is to provide a novel and improved system which is simple and relatively inexpensive and which requires no specialized components that are not well known in the art.

These and other objects, features and advantages will be apparent to those skilled in the art when taken into consideration with the following drawings wherein like reference numerals indicate like or corresponding parts throughout the several views and wherein.

Description of one preferred embodiment

Figure 1:
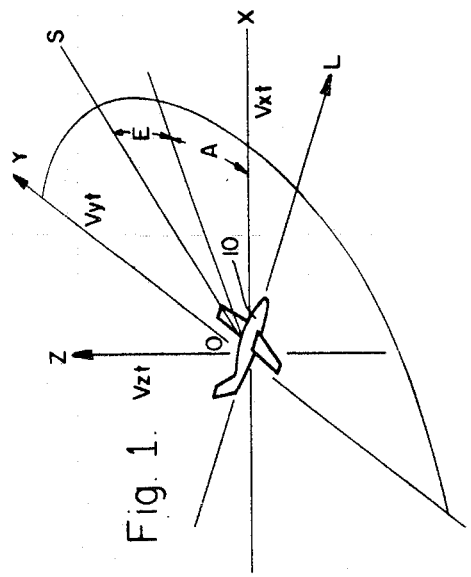
FIGURE 1 is a schematic drawing showing the relative geometric vector positions with respect to an aircraft in flight which may be employed to carry a radar system embodying the present invention.

Turning now to a more detailed description of this invention and to facilitate the understanding of the device, there is shown in FIGURE 1, an aircraft 10 carrying a radar system employing the present invention which can be presumed to be flying so that the axis of symmetry (or longitudinal axis) identified by the vector L lies in a vertical plane which is defined by a horizontal axis OX, where O indicates the position of the aircraft and X is the direction of the vertical plane, and a vertical axis OZ. The OY axis completes the right-handed three-dimension rectangular coordinate system XYZ. The axis OY is horizontal and is perpendicular to the vertical plane containing the axis OX and OZ. The radar antenna is presumed to generate a beam which has a peak gain along the line OS. The asimuth of the beam may be defined by the angle between the two vertical planes containing OL and OS respectively. This angle is noted as angle A in FIGURE 1. The elevation angle E of the antenna is the angle between the line OS and a horizontal plane.

Figure 2:
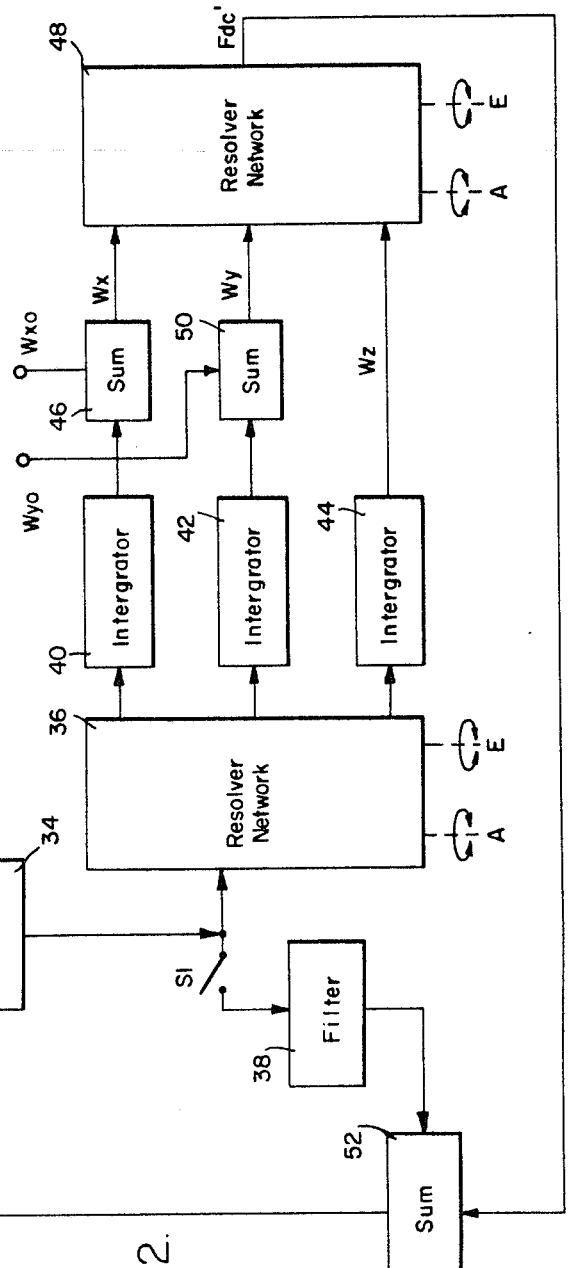
FIGURE 2 is a block diagram showing the various components of one preferred embodiment of the present invention.
Figure 2:
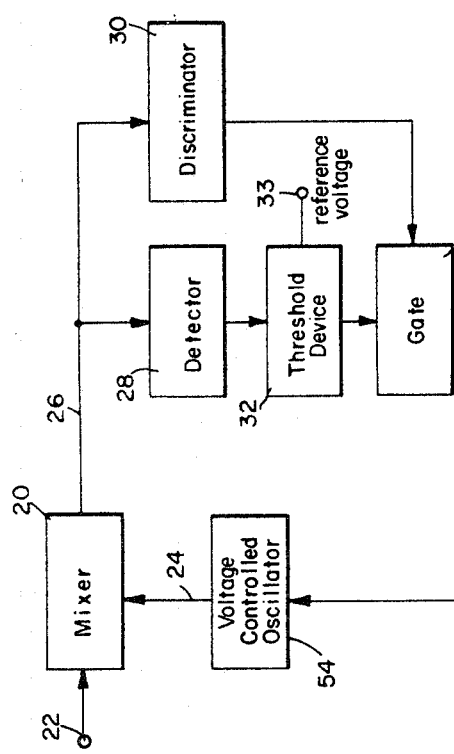

With reference now to FIGURE 2, there is shown a mixer 20 which receives an input at a terminal 22 and an input at a terminal 24, and has an output on lead line 26 which is coupled to a detector 28 and is also coupled to a discriminator 30. The input signal applied to terminal 22 is the ground return echoes and can be mathematically specified as $P \sin [2\pi(f2+fd)t+\phi 2]$. Where P is the amplitude of the signal, $f2$ is the frequency of echoes from targets which do not move realtive to the radar, $fd$ is the Doppler frequency, $t$ is time of an arbitrary reference and $\varphi$ is the phase of the signal and is dependent upon the arbitrary reference. The output of detector 28 is coupled to a threshold device 32 which in turn has an output coupled to a gate 34. The output of gate 34 is $[(gt)(fd-fdc)]$ which provides $$f = fd - fdc$$

where $fdc$ is the Doppler shift computed by the clutter tracking loop and $fd$ is the instantaneous Doppler shift of the received signal. $fdc$ differs from $fd$ because of transient lags and random errors. $g$ is the voltage gain of the clutter switch 34 and is a function of time $t$. The purpose of gate 34 is to reduce $g$ to a negligible value when the signal on line 24 is too small to be consistent with the assumption that clutter echoes are present because the output of discriminator 30 is not a useful measure of $fd-fdc$ when the received signal becomes too weak.

The output of discriminator 30 is also coupled to a gate 34 and the output of gate 34 is coupled to a resolver network 36 and to a filter 38. Resolver network 36 has three outputs which are coupled to integrators 40, 42 and 44 respectively where integrator 40 has an output which may be coupled to a summation network 46 and the output of summation network 46 is coupled to a resolver network 48. The output of integrator 42 is coupled to a summation network 50 and the output of summation network 50 is also coupled as an input to resolver network 48. The output of integrator 44 is coupled directly as an input to resolver 48. The output of resolver 48 is coupled into a summation network 52. The output of summation network 52 is coupled into a voltage controlled oscillator 54 which provides the output 24 to mixer 20 to complete the loop.

The dotted lines A and E are indicative of mechanical shaft inputs which have angles of rotation which are equal to the antenna azimuth and elevation respectively. Many radars actually have such shafts available in their present day systems or have electrical signals indicative of azimuth A and elevation E positions. The shaft of the potentiometer employed as resolving means may be directly connected to available shafts or may be driven by servomechanisms which force them to follow the actual antenna motion. The potentiometers shown are a type which require positive and negative excitation voltages. All the amplifiers have a voltage gain of plus or minus unity.

$Wx$, $Wy$ and $Wz$ are voltages proportional to the aircraft velocity components along the $x$, $y$ and $z$ axes respectively. These voltages are also proportional to the Doppler shift of a target located on these axes respectively. The projection of the aircraft velocity on the antenna axis OS, as shown in FIGURE 1, and the Doppler shift of energy returned from a scatterer on the antenna axis are both proportional to the voltage:

$$fdc' = [(Wx \cos A + Wy \sin A) \cos E + Wz \sin E]k$$

A constant $k$ of proportionality is added to make both sides of the equation equal, $fdc$ being the compensated Doppler shift frequency and $fdc1$ being a voltage proportional to $fdc$ computed within the analog computing system of this invention. $Wx$, $Wy$ and $Wz$ are the values of voltages to which the feedback loop settles. The resolver network 36 may be sine potentiometers and inverting amplifiers, as set forth in FIGURE 4, because the voltages in this case are slowly varying DC voltages.

Figure 3:
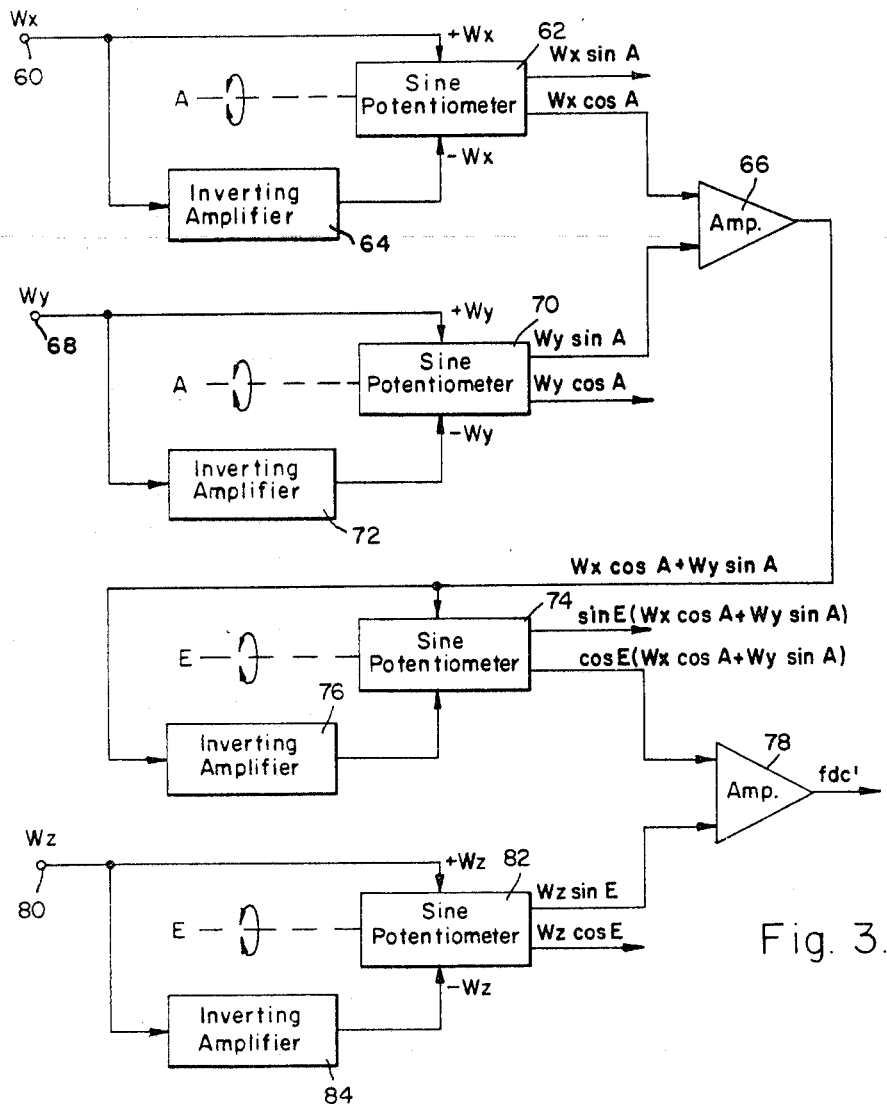
FIGURE 3 is a block diagram of the resolvers used in the embodiment shown in FIGURE 2.

These voltages are then passed through resolvers or sine potentiometers as set forth in FIGURE 3 to generate the $fdc'$ aforesaid. The gain of the sine potentiometers therein will vary sinusoidally with the rotation of the shaft angles A and E. Sine potentiometers and resolvers are well known to those skilled in the art and the operation and the manner in which the signals are derived therefrom will not be explained herein to preserve time and space.

The output voltage $fdc'$ from resolver network 48 as shown in FIGURE 2 is fed to voltage control oscillator 54 and shifts its frequency from a value $f1$ by $fdc$ cycle per second. The output of voltage controlled oscillator 54 is applied to mixer 20 and beat with the received signal at input 22 to generate a beat note which is free of or nearly free of the Doppler shift $fd$. This signal is then passed through discriminator 30 which has an output that is the voltage proportional to the difference between the frequency of the beat note and the center frequency $(f2-f1)$ of discriminator 30. Voltage control oscillators, mixers and discriminators used in the embodiment of this invention are well known to those skilled in the art and a detailed description of them will not be made herein to preserve time and space.

Detector 28 rectifies the beat note and the rectified output thereof may be filtered to remove the radio frequency component and then is compared by threshold device 32 with a reference voltage applied to terminal 33. When the output of detector 28, rectified by the filter, exceeds the threshold of the reference voltage on terminal 33 applied to threshold device 32, gate 34 is opened and the output of discriminator 30 is allowed to pass therethrough. The purpose of gate 34 is to disregard the output of discriminataor 30 when no clutter (ground return) is present on the output of discriminator 30.

Figure 4:
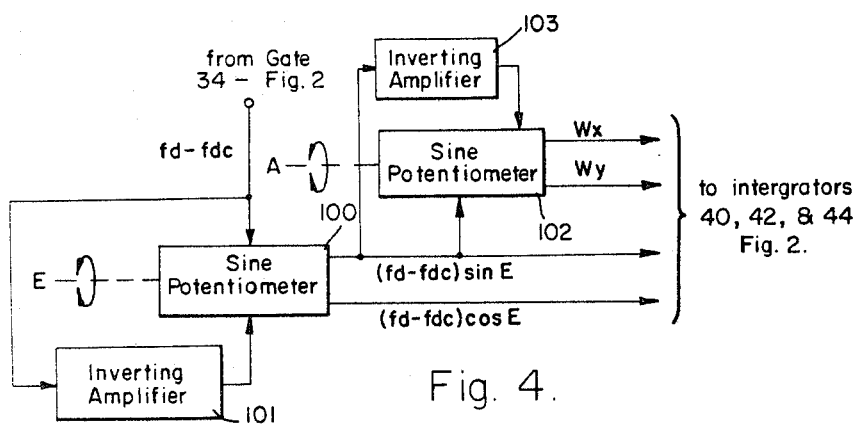
FIGURE 4 is a block diagram of the input resolvers shown in FIGURE 2.

The output of discriminator 30 is the negative of the vector error in the Doppler frequency along the direction in which the antenna is presently pointed. This error is resolved by resolver network 36 into three components proportional to the error and the projections of the vector OS on the $x$, $y$ and $z$ axes respectively. These components are smoothed in integrators 40, 42 and 44 and the smoothed values used to correct $Wx$, $Wy$ and $Wz$. $Wx$, $Wy$ and $Wz$ represent voltages proportional to the computed value of Doppler shift in the particular $x$, $y$ or $z$ coordinate direction. FIGURE 4 shows how this may be accomplished. The sine/cosine potentiometers, shown in FIGURE 4, perform the function of resolver network 36 and FIGURE 3 shows how resolver network 48 is implemented, and will be explained in more detail.

To reduce transients and speed their decay, estimates of $WyO$ and $WxO$ may be added to the outputs of integrators 40 and 42 on which $Wx$ and $Wy$ are stored, where $WxO$ and $WyO$ are indicative of wind velocities supplied by outside sources. Although this feature is shown, it should be understood that the invention will operate exclusive of these features and is not limited thereto.

With reference now to FIGURE 3, there is shown three input terminals $Wx$, $Wy$ and $Wz$ which are indicative of signals on the output of resolver 36, which signals have been stored and smoothed in integrators 40, 42 and 44 respectively. A terminal 60 is coupled as an input to a sine potentiometer 62 and is also coupled to an inverting amplifier 64 for applying a $+Wx$ signal thereto. The output of inverting amplifier 64 is also coupled as a second input to the sine potentiometer 62 for applying a $-Wx$ signal thereto. Sine potentiometer has a mechanical input for positioning of the wiper arm therein and is designated by the letter A, and is coupled to respond to the azimuth position of the antenna axis. Sine potentiometer 62 has two outputs; one of which is denoted as $(Wx \cos A)$ and is applied to the input of the amplifier 66. A second output is provided from sine potentiometer 62 which is denoted as $(Wx \sin A)$. The formation of $(Wx \cos A)$ and $(Wx \sin A)$ within sine potentiometers is well known in the art and no explanation thereof will be afforded herein.

Terminal 68 receives the $Wy$ input signal and is coupled as an input $+Wy$ to sine potentiometer 70 and also coupled to inverting amplifier 72. The output $-Wy$ of inverting amplifier 72 is coupled as the second input to sine potentiometer 70 for applying the inverted $Wy$ signal thereto. Sine potentiometer 70 also has a mechanical input and is driven by the azimuth position of the antenna axis A. Sine potentiometer 70 has two outputs;

$$(Wy \sin A)$$

which is coupled as a second input to amplifier 66, and $(Wy \cos A)$.

The output of amplifier 66 is denoted as $$(Wx \cos A + Wy \sin A)$$

and is coupled to a sine potentiometer 74 and is also coupled to inverting amplifier 76, which amplifier has an output $-(Wx \cos A + Wy \sin A)$ which is coupled as a second input to sine potentiometer 74. Sine potentiometer 74 has a mechanical shaft input for manipulation of the wiper arm therein and is coupled to the elevation angle E of the antenna axis. Output of sine potentiometer 74 is denoted as $[\cos E (Wx \cos A + Wy \sin A)]$ and is coupled as an input to summing amplifier 78.

The $Wz$ is applied to terminal 80 which in turn is coupled as one input $+Wz$ to a sine potentiometer 82 and is also coupled to an inverting amplifier 84. The output $-Wz$ of amplifier 84 is coupled as a second input to sine potentiometer 82. The output of sine potentiometer 82 is denoted as $(Wz \cos E)$ and a second output is denoted as $(Wz \sin E)$ and is coupled to the summing amplifier 78 and provides the output $fdc$ because:

$$fdc' = [(Wx \cos A + Wy \sin A) \cos E + Wz \sin E]$$

which has been accomplished by the sine potentiometers set forth herein and in connection with FIGURE 3.

With reference now to FIGURE 4, there is shown a preferred implementation of the resolver 36 for generating the terms $[(fd-fdc) \cos E \cos A]$, $$[(fd-fdc) \cos E \sin A]$$

and $[(fd-fdc) \sin E]$ for applying to the integrators 40, 42 and 44 respectively to generate the term $Wx$, $Wy$ and $Wz$ in that order. For the resolver network 36 two sine potentiometers 100 and 102 may be used, wherein sine potentiometer 100 is mechanically driven by the elevation antenna axis E and sine potentiometer 102 is mechanically driven by the azimuth antenna axis A; each sine potentiometer 100 and 102 includes an inverting amplifier 101 and 103 for presenting the inverted function thereto. The output of gate 34 is coupled as an input to sine potentiometer 100 and provides the term $(fd-fdc)$ and has two outputs, one of which may be coupled directly to integrator 44 and provides the term $[(fd-fdc) \sin E]$ and the other output provides the term $[(fd-fdc) \cos E]$, and is directly coupled as an input to sine potentiometer 102, which sine potentiometer 102 has two outputs, one of which is coupled to integrator 40 and provides the appropriate term therefore, and the other output is coupled to integrator 42 and provides its appropriate term. These correction signals are fed to the integrators 40, 42 and 44 respectively which may be in the form of feedback amplifiers having transfer functions equivalent to low pass filters with long time constants. These integrators average the error inputs and correct the value of $Wx$, $Wy$ and $Wz$ and since $Wx$, $Wy$ and $Wz$ change slowly when the aircraft maneuvers, rather long smoothing times may be used. The response time of the closed loop within the integrators may be about one second. This may be increased by decreasing the loopgains or providing negative feedback around the cascade of the voltage controlled oscillator 54, mixer 20 and discriminator 30 by closing a switch S1 which also tends to linearize the characteristics of the voltage controlled oscillator 54, and discriminator 30 in cascade, and reduce deviation of the beat note from the frequency $f2-f1$ wherein some applications this may be desirable.

Thus, we have provided in this invention that the velocity of an aircraft can be determined by measuring the Doppler shift of the echo from the surface of the earth and that a simple mechanization compatible with the normal operations of a radar system as it searches in azimuth and elevation has been provided. This system provides the greatest smoothing compatible with desired ability to respond to aircraft maneuvers. The system is independent of other aircraft systems (other than the radar itself) and accepts as initial input setting relative course estimates of the aircraft velocity.

In summation, the output of the motion compensation loop provides the voltage $fdc$ which the loop attempts to make equal to the measured Doppler frequency shift $fd$. It is used to control a voltage controlled oscillator which is used to remove clutter signal. The residual Doppler error is measured by a discriminator whose output is a voltage $(fd-fdc)$ proportional to the residual Doppler error. A detector and threshold circuit act to sense the amplitude of the clutter signal and control a gate which forces the discriminator output to 0 when the clutter power falls below some predetermined value. As long as clutter is present over parts of the selected azimuth and elevation search pattern, the feedback loop operates in a desired function.

Having thus described one embodiment of this invention, what is claimed is:

1. A radar system capable of distinguishing ground clutter Doppler return signals including an analog motion compensation means for introducing Doppler shift correction signals into the radar system comprising:
   a first resolving network for providing voltages proportional to velocity component inputs along predetermined antenna axis of the radar system; and
   a second resolving network capable of computing an output signal from the velocity axis provided by said first resolving network wherein the output signal is proportional to the velocity errors.

2. The system as defined in claim 1 wherein said first and second resolving network comprises sine potentiometers.

3. In an analog computing system:
   a mixer having a first input signal circuit, a second input signal circuit and an output signal circuit, the first input signal circuit being capable of receiving a plurality of input signals; and
   a feedback loop, said feedback loop including a computing network coupled to the output signal circuit of said mixer, said computing network having a first resolving network capable of providing output voltages proportional to a predetermined input, and a second resolving network capable of computing voltages derived from said voltages of said first resolving network which is proportional to predetermined motion errors, a voltage controlled oscillator being coupled between said computing network and the input circuit of said mixer, said computing network being capable of computing analog error voltages for controlling the output of said voltage control oscillator.

4. In an analog computing system as defined in claim 3 wherein said feedback loop further includes a means for measuring residual error signals in the plurality of pulses received by the first input circuit of said mixer, said means being coupled between the output signal circuit of said mixer and said computing network.

5. In an analog computing network as defined in claim 3 wherein said feedback loop further includes means for sensing the amplitude of signals provided on the output signal circuit of said mixer and a control gate, said control gate being capable of forcing the output of said means for measuring the residual error signal to a minimum value when the amplitude of this signal on the output circuit falls below a predetermined value, said sensing means and said control gate being coupled to the output signal circuit of said mixer and said computing network.

6. In an analog computing system as defined in claim 3 wherein said feedback loop further includes a discriminator for measuring the residual error in an output signal on the output signal circuit of said mixer, a detector and a threshold circuit for sensing the amplitude of the signal provided on the output signal circuit of said mixer, said detector and threshold circuit being coupled in parallel with said discriminator and being coupled to the output signal circuit of said mixer, and a control gate coupled between said detector and threshold ciruuit and said computing network and to said discriminator, said gate being capable of forcing the discriminator output signal to a predetermined value when the error on the output signal of the output signal circuit of said mixer falls below a predetermined value, said control gate being controlled by said detector and said threshold circuit.

7. In an analog computing system:
   a mixer having a first input signal circuit, a second input signal circuit, and an output signal circuit, the first input signal circuit being capable of receiving a plurality of input signals; and
   a feedback loop including a resolver network for computing analog error functions and a controllable oscillator means coupled in series with said resolving network, said feedback loop being coupled between the output circuit of said mixer and the second input circuit.

8. In the analog computing system as defined in claim 7 wherein said resolving network comprises a plurality of sine potentiometers.

References Cited

UNITED STATES PATENTS 3,267,468   8/1966   Stull _____ 343—8 X

RODNEY D. BENNETT, *Primary Examiner.*

CHARLES L. WHITHAM, *Assistant Examiner.*

U.S. Cl. X.R.